Jan. 3, 1961     H. EPSTEIN     2,967,082
ELECTROGRAPHIC PLOTTER
Filed May 20, 1955     4 Sheets-Sheet 1

INVENTOR.
HERMAN EPSTEIN
BY
Ralph K. Bonell
AGENT

Jan. 3, 1961 H. EPSTEIN 2,967,082
ELECTROGRAPHIC PLOTTER
Filed May 20, 1955 4 Sheets-Sheet 2
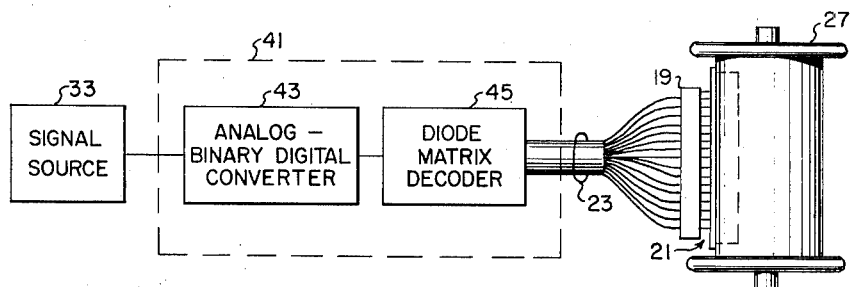
Fig. 4
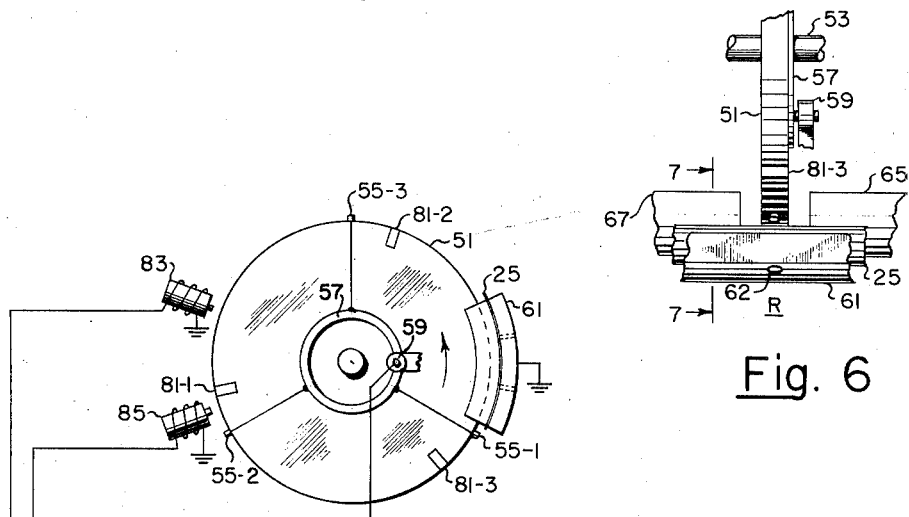
Fig. 6
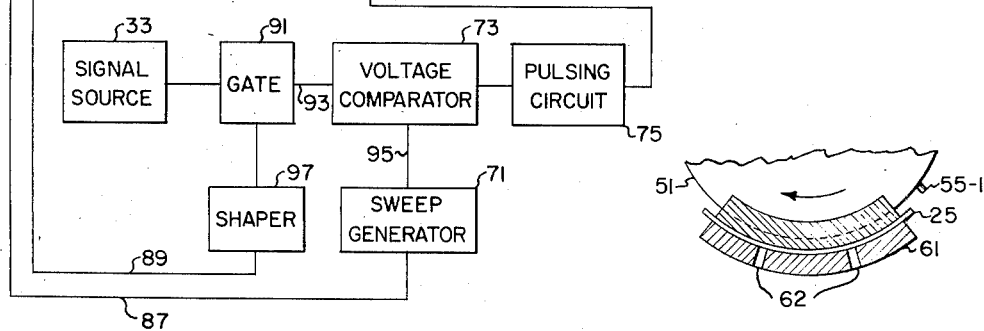
Fig. 5
Fig. 7
*INVENTOR.*
HERMAN EPSTEIN
BY
Ralph K. Bonell
AGENT Jan. 3, 1961  H. EPSTEIN  2,967,082
ELECTROGRAPHIC PLOTTER
Filed May 20, 1955  4 Sheets-Sheet 3

INVENTOR.
HERMAN EPSTEIN
BY
Ralph K. Bonell
AGENT

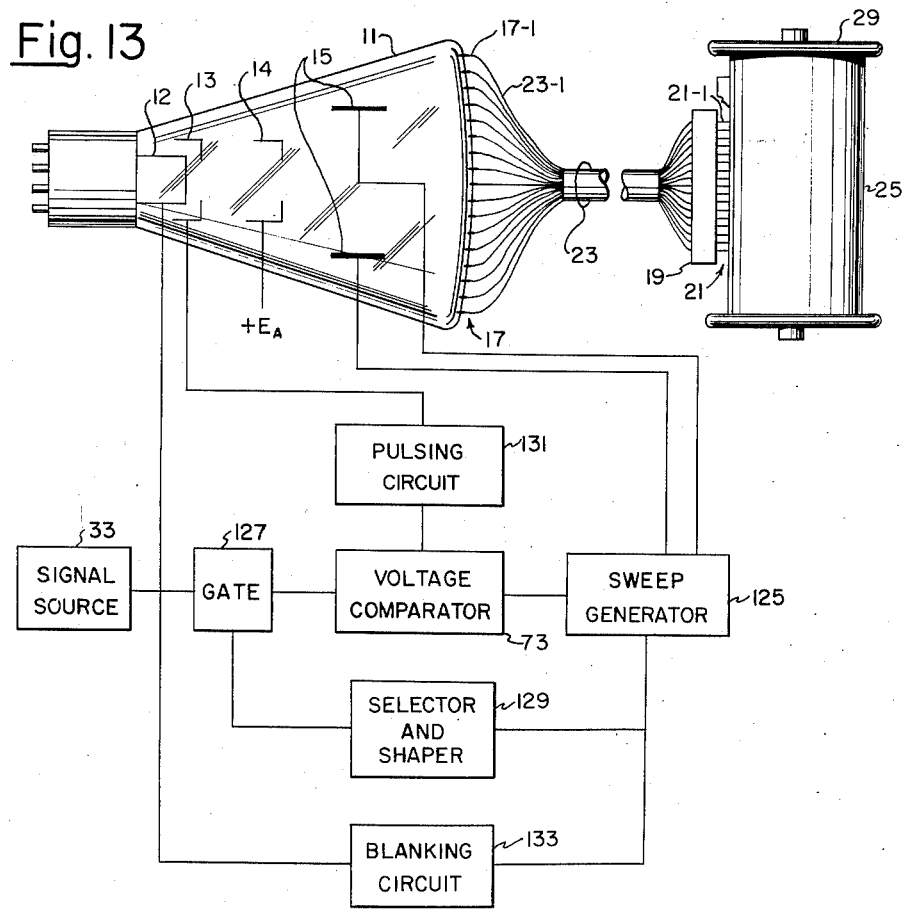

United States Patent Office 2,967,082
Patented Jan. 3, 1961

2,967,082

ELECTROGRAPHIC PLOTTER

Herman Epstein, West Chester, Pa., assignor to Burroughs Corporation, Detroit, Mich., a corporation of Michigan Filed May 20, 1955, Ser. No. 509,883

6 Claims. (Cl. 346—33)

This invention relates to recording apparatus and more particularly to a non-photographic method of and means for producing a visual record of electrical waveforms.

The making of a permanent visual record of the values of a variable electrical voltage, which may be a direct representation of an electrical quantity or an analog of some other type of quantity, is an important feature of many physical investigations. Heretofore in recording electrical waveforms, where the frequency range precluded the use of mechanical means, variations in the ordinate value of a wave have commonly been reproduced as displacements of a beam of light or of electrons (the latter being transformed into a light pattern) and the result recorded photographically. Photographic methods, however, have the disadvantage of requiring an appreciable interval after the occurrence of a recorded event before the initial latent image can be rendered visible, as well as the undesirable use of liquid baths in the processing of the sensitive film or paper.

According to the principles of the present invention a latent electrostatic image of an input electrical voltage wave is formed on the surface of a paper tape, or like member, in point-by-point manner as a sequence of closely spaced dots, each dot comprising a minute electrically charged area. These charged areas are then made visible by causing the adherence thereto of suitable colored powder particles, as by passing the paper through a powder bath or by otherwise applying powder to the surface of the paper. This "development" of the latent point images of the recorded waveform is followed by thermal or other fixing to cause permanent retention of the powder particles. The sequence of operations which includes charging, inking, developing and fixing, is a continuous process carried out at high speed so that each part of the record is rendered visible a fraction of a second after the corresponding portion of the input wave is applied to the recorder. The process, moreover, is a dry one, no liquid baths being required.

The present invention which has as its field the production of a graphical record makes use of certain electrostatic printing processes which in their application to the printing of letters and other characters are disclosed in the following co-pending applications: Serial No. 343,026, filed March 18, 1953, now Patent No. 2,780,774; Serial No. 443,646, filed July 15, 1954, and Serial No. 478,602, filed December 30, 1954, now Patent No. 2,931,688, all assigned to the assignee of the present invention.

It is an object of the invention to provide improved means for making a record of an electrical voltage waveform whereby successive portions of the record, initially invisible, are rendered visible after a delay of only a small fraction of a second.

It is another object to provide improved means for recording electrical waveforms which does not require processing the record through liquid baths.

Another object is the provision of means for energizing a particular one of a plurality of aligned recording electrodes in accordance with the instantaneous value of an electrical wave.

Another object is the provision of means for laterally scanning a moving record base and printing indicia at phases of the scan corresponding respectively to the instantaneous values of an electrical wave.

Another object is to provide a method of making a digitalized record of an electrical waveform.

Another object is to provide an improved method of recording electrical waveforms which includes the formation of a latent electrostatic image on the surface of a paper tape or like medium and the subsequent materialization of this image as a trace of powder particles adhering to or embedded in the surface of the paper.

Other objects and advantages will be apparent from consideration of the following specification and of the appended drawings in which:

Fig. 4 is a schematic showing, partly in block diagram form, of another embodiment of the invention making use of analog-to-digital conversion means for the selective energization of a plurality of recorded electrodes;

Fig. 5 is a schematic showing, also partly in block diagram form, of still another embodiment of the invention wherein scanning means is employed for selectively energizing the recording electrodes;

Fig. 6 is a fractional view, to an enlarged scale, of the paper guides and associated members of Fig. 5;

Fig. 7 is a section taken along the line 7—7 of Fig. 6;

Fig. 12 is a circuit diagram of a voltage comparator;

Fig. 13 is a diagrammatic showing of a modification of the arrangement of Fig. 1.

Figure 1:
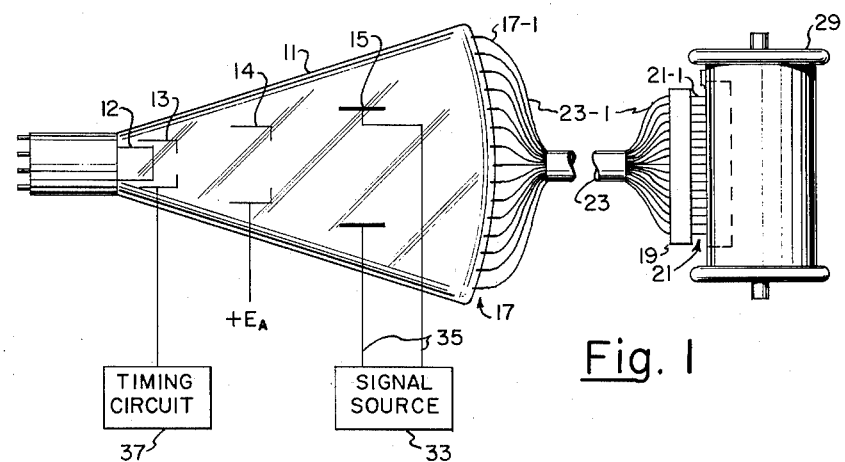
Fig. 1 is a diagrammatic showing, in the form of a top plan view, of an assembly comprising one embodiment of the invention which makes use of a multi-target cathode ray tube as a selection means.
Figure 2:
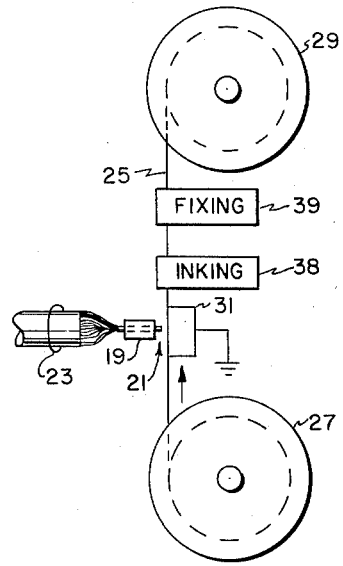
Fig. 2 is a partial end elevation of the assembly of Fig. 1.

Referring particularly to Figs. 1 and 2, there is shown a cathode ray tube 11 having a cathode 12, control electrode 13, accelerating electrode 14, a pair of electrodes 15 for deflecting a formed electron beam in one direction and a plurality of target electrodes mounted on and passing through the face of the tube, these last electrodes being collectively referenced as 17 and individually referred to by that number followed by an appropriate suffix, as electrodes 17–1. Electrodes 17 are arranged in a linear array extending in the direction of the deflection of the beam.

A stationary recording head 19 mounts a plurality of pin-shaped recording electrodes 21 in a second linear array, the number of these electrodes being the same as the number of target electrodes 17. Each electrode 21 of the recording electrode array is connected by one of leads 23 to the electrode 17 occupying a corresponding position in the target electrode array, for example, electrode 21–1 is connected to electrode 17–1 by way of lead 23–1. Electrodes 21, through suitable design of the mounting arrangements, can be spaced more closely in head 19 than can electrodes 17 in the face of tube 11; for example, a recording electrode spacing of the order of ten one-thousandths of an inch or less is possible. This permits a resolution along the axis of ordinates of a recorded graph that is compatible with the reproduction of relatively high frequency components of a signal wave. In the arrangement of Fig. 1 tube 11 which serves as a means for selectively energizing electrodes 21, may be positioned remote from head 19.

A recording medium or base 25 in sheet form is transported, through the operation of driving means (not shown), from feed reel 27 to take up reel 29, in the process passing beneath electrodes 21 in a direction perpendicular to the alignment thereof, the electrode array thereby defining a recording station or recording position past which the medium passes. An intermittent feed may be used to permit sheet 25 to remain stationary at the recording position at the instant when recording occurs. A suitable intermittent feed mechanism for high speed operation is disclosed in co-pending application Serial No. 503,714, filed April 25, 1955, now Patent No. 2,858,131.

The recording medium may be a relatively narrow tape or a wider sheet, for example 12 inches or more wide. On the side of sheet 25 opposite electrodes 21, there is located an electrode 31, herein termed a "ground" electrode but which need not be at ground potential. The spacing of one surface of sheet 25 from the near ends of electrodes 21 may be of the order of a few thousandths of an inch while the other surface may either be spaced slightly from electrode 31 or be in actual contact therewith, the ground electrode in the latter case further serving as a guide for the sheet. Various compositions and structures for sheet 25 are available, including paper manufactured according to a formula that inherently results in a high surface resistivity, which is a desired characteristic, or a paper base coated with a plastic or other material which imparts the desired surface resistivity to the paper may be used. One such coating material which has been successfully employed is a polyethylene. A surface resistivity that has been found suitable for the recording process later to be described is of the order of $10^{10}$ to $10^{16}$ ohms per square. In the use of a coated paper the high resistivity surface faces recording electrodes 21.

In the operation of the embodiment of Figs. 1 and 2, a signal voltage to be recorded, as from source 33, is applied across deflection plates 15 of tube 11 by way of leads 35. Assuming that the electron beam is formed and that an adjustment of the working condition of the tube has been made such that a minimum or reference level of the signal voltage to be recorded directs the beam onto, for example, the bottom one of electrodes 17, as arranged in the figure, and further that a substantially linear relationship exists between signal voltage and beam deflection (which is usually the case), the position in its array of the particular electrode 17 on which the beam impinges will be proportional to the instantaneous value of the signal voltage.

Through the connections supplied by leads 23 the position in its array of the recording electrode 21 energized by the beam voltage is also made proportional to the instantaneous signal voltage. The beam voltage, amplified if necessary (by means not shown), when applied to this electrode is adapted to charge it to a, preferably, negative potential relative to ground electrode 31 of sufficient magnitude to cause a non-arcing electrical discharge between the two electrodes, as described in above-mentioned application S.N. 443,646, for example. The beam circuit may supply this entire voltage or only the necessary increment above a bias voltage supplied by other means (not shown). An area of the surface of paper 25 adjacent electrodes 21 having the configuration of a small dot, thereby acquires a charge. Conditions favorable to the production of a figure which will appear substantially as a dot in the developed record are disclosed in the cited applications Serial No. 443,646 and Serial No. 478,602. Particular reference is made to the disclosure in application Serial No. 478,602 of a discharge atmosphere containing an electronegative gas as a means for reducing lateral spreading of the discharge and which therefore tends to cause the charged area of the surface of the medium to be substantially defined by the discharge surface of the recording electrode. If desired, instead of the electron beam of tube 11 being continuously in an operative condition it may be turned on or formed intermittently by applying periodic timing signals from a suitable timing circuit 37 to control electrode 13 to effect a sampling of the signal wave at discrete time intervals. This gating action tends to reduce electrical noise.

Figure 3:
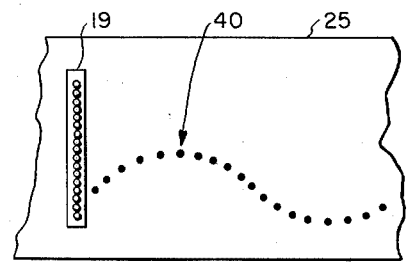
Fig. 3 is a detail of the recording head and a portion of the recording medium of Fig. 1, showing a recorded waveform.

The latent electrostatic image comprising a sequence of dots formed as above described may be developed or inked in the manner described in applications Serial No. 343,026 and Serial No. 443,646, by causing sheet 25 to pass through a bath 38 of a suitable powder and may then be fixed by causing the powder particles adhering to the charged image areas to become embedded in or firmly attached to the record. When a sheet coated with a thermoplastic material is employed this fixing can be accomplished, for example, by partially softening the coating through the application of heat and applying suitable pressure to the particles, in a continuous process. Excess powder adhering to non-image areas may be removed before fixing by agitating the record sheet, by means not here shown. A section 40 of a recorded waveform is seen in Fig. 3, the spacing of the discrete dots being exaggerated for clarity of illustration.

In the embodiment of Fig. 4, the selection of recording electrodes 21 for energization, and thereby for printing points on a recorded wave, occurs through the operation of an analog-to-digital converter circuit 41. By way of example, circuit 41 may comprise as a first unit an analog-to-binary digital converter 43, the binary output of which applied to a second unit, diode decoding matrix 45, with the result that a voltage is applied to a recording electrode 21 (by way of a connecting lead 23) which corresponds in position to the instantaneous value of the signal voltage supplied by source 33, as in the operation of the embodiment of Fig. 1. Various forms of analog-to-digital converters are, of themselves, known, including component circuits thereof such as are referred to above. General reference in this connection is made to an article entitled "A Survey of Analog to Digital Converters," page 98 of a publication of the American Institute of Electrical Engineers, March 1953, entitled "Review of Input and Output Equipment Used in Computing Systems."

In the embodiment of Figs. 5 to 7, the recording medium is scanned along the axis of ordinates of the plotted graph, that is, transversely of the direction of its travel, by a single moving electrode at a time and this electrode is energized at a phase of the scan corresponding to the instantaneous value of the signal voltage wave, to print a point on the recorded graph which has a like ordinate value. Displacement of the electrode corresponds, generally, in recording position selection, to deflection of the beam in the arrangement of Fig. 1.

Disc 51 mounted on shaft 53 for rotation about the axis thereof carries at its periphery a plurality of preferably equiangularly-spaced pin-shaped electrodes, illustrated as electrodes 55-1, 55-2 and 55-3. A common external connection thereto is provided by slip ring 57 and brush 59. As the disc rotates electrodes 55 pass in close proximity to recording medium 25 which at the recording position slides over ground electrode 61 having the surface thereof facing the disc formed to a radius about the axis of shaft 53. As in the previously described embodiments, member 25 may be a paper tape, or wider sheet, the scanned surface of which is adapted to receive and hold an electrostatic charge. Suitable paper transport and storage means (not here shown) are assumed to be provided. For example, the previously referred to intermittent paper feed mechanism of application S.N. 503,714 may advantageously be incorporated in the embodiment of Fig. 5 to allow sheet 25 to remain stationary while printing occurs. In order to cause paper 25 to conform, at recording station R, to the contour of electrode 61, spaced guide members 65 and 67 are provided on opposite sides of disc 51, and suction may be applied to holes 62 in electrode 61.

The circuits for energizing electrode 55–1 (and the other electrodes 55) at the proper phase of rotation of disc 51 are shown as comprising a triggered sweep generator 71 and a voltage comparator 73, the latter circuit receiving input voltages from source 33 and generator 71 and energizing pulsing circuit 75 in accordance with a predetermined relationship therebetween to supply the high voltage necessary for producing a discharge between the recording electrode and ground electrode 61.

Figure 9:
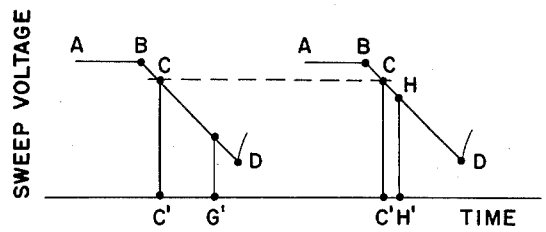
Figs. 8, 9 and 10 are waveform diagrams, for purposes of explanation.
Figure 8:
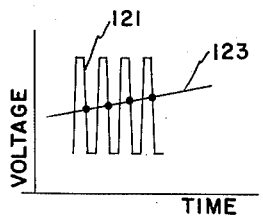

Sweep generator 71 may be of any type providing an output voltage whose amplitude varies with time in a substantially linear manner. Examples of such circuits are known, one being the "Phantastron." Descriptions of "Phantastron" circuits are to be found in the book "Waveforms," No. 19 of the MIT Radiation Laboratory Series, particular reference being made to Section 5.16 commencing on page 197 thereof. A simplified diagram of the output voltage wave of such a circuit is shown in Figs. 8 and 9, the latter being to a greatly enlarged scale. In Fig. 9 the linear voltage run-down from B to D permits measuring a change of voltage in terms of time. The complete run-down time from B to D, is made somewhat greater than the time taken by an electrode 55 to scan the recording medium 25, laterally. The time origin of the measurement period may be fixed by triggering the sweep circuit at some time corresponding to point B on the line AB, or the sweep circuit output or the signal voltage may be gated so that the measurement period begins during the rundown period of the sweep voltage; or these methods may be combined.

In Fig. 5 timing impulses controlling the energization of recording electrode 55–1 are generated in synchronism with the rotation of disc 51 by the passage of a permanent magnet plug 81–1, one of three mounted on the disc, past stationary magnet coils 83 and 85 angularly positioned to secure the desired phasing of the impulses. An impulse thus generated in magnet coil 83 is applied to sweep generator 71 by way of lead 87 to trigger the generator and start an operating cycle thereof while an impulse generated in magnet coil 85 is applied by way of lead 89 to gate 91, to open the gate and provide a path from signal source 33 to voltage comparator 73 for a period sufficient to effect a comparison of the signal and generator voltages. This comparison is made subsequent to the start of an operating cycle of generator 71 and thereby allows a selection of the portion of the cycle utilized for comparison purposes, for example, to select the most linear portion. Generator circuit 71 may include means for shaping the impulse derived from magnet 83, if necessary.

Shaper 97 includes the necessary conventional circuits for obtaining a pulse having a form and duration suitable for opening gate 91 for a desired interval responsive to the trigger pulse supplied by magnet 85. The requisite duration of the output pulse may be controlled, for example, by a monostable multivibrator or like timing circuit.

Voltage comparator 73 is adapted to supply an output when, and only when, a predetermined one of two applied input voltages has a value greater than the other. A suitable circuit for this purpose is shown in Fig. 12 wherein the voltages to be compared are $E_1$ and $E_2$, which become $E_1'$ and $E_2'$, respectively, after amplification by dual amplifier 99. The latter voltages are applied to a modulator circuit 100 to control the biases of a pair of diodes 101 and 103 therein. The two input voltages are introduced by way of center taps on the secondary and primary windings of input transformer 105 and output transformer 107, respectively. Transformer 105 supplies a voltage from A.C. source 109 to the modulator circuit, while transformer 107 supplies an output to pulsing circuit 75 when the diodes are in suitable conducting condition, this being determined by the difference between voltages $E_1'$ and $E_2'$ which biases the diodes.

Figure 11:
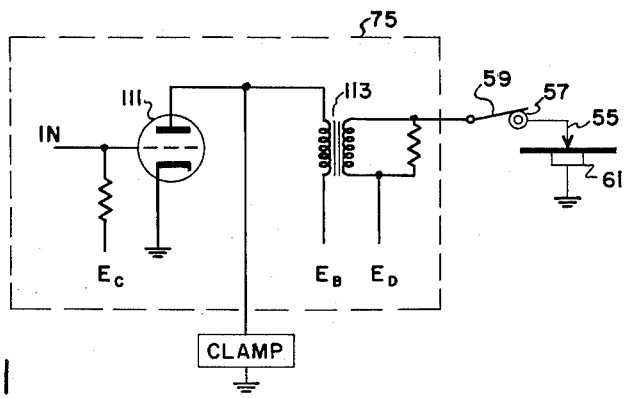
Fig. 11 is a circuit diagram of a pulsing circuit.

A diagram of a circuit suitable for use as pulsing circuit 75 is shown in Fig. 11. This comprises a triode 111 and a step-up transformer 113 which applies a voltage having a peak value of the order of 500 volts to rotating electrodes 55 by way of slip ring and brush combination 57, 59. A biasing voltage $E_D$ of the same order of magnitude and of the same polarity as the pulsing voltage is constantly applied to electrodes 55. A discharge between the active electrode 55 and ground electrode 61 takes place when an output pulse from circuit 75 increases the absolute magnitude of the electrode potential to approximately 1000 volts, this voltage preferably being negative with respect to electrode 61.

Figure 10:
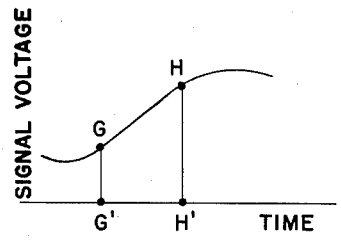

In the operation of the arrangements of Fig. 5, assuming as an initial phase an instant somewhat before electrode 55–1 in its travel reaches the near edge of sheet 25, permanent magnet 81 in passing magnet coil 83 generates an impulse voltage therein which is applied to sweep generator 71 to trigger that generator and start the voltage run-down at an instant illustrated by point B (Fig. 9). A short while later magnet 81 in passing magnet coil 85 generates an impulse therein which, when shaped by shaping circuit 97, holds gate 91 open for a period sufficient to permit a sample of the signal voltage from source 33 to reach voltage comparator 73. This voltage is represented, by way of example, as G'G (Fig. 10). At the instant when the sample voltage is first applied to comparator 73 the sweep circuit voltage is caused, by suitable phasing, to be at a point C on the linear run-down, this point representing a higher voltage than any measured voltage and serving as an origin of both time and voltage in the comparison made by circuit 75. If C'C is the instantaneous value of $E_2$ (Fig. 12) and G'G of $E_1$, diodes 101 and 103 are biased by the difference between $E_2'$ and $E_1'$ (the amplified versions of $E_2$ and $E_1$, respectively) to a non-conducting condition. The generator voltage decreases along the line CD and when point G is reached the signal and sweep generator voltages are equal. Just beyond this point the signal voltage becomes the higher of the two and thereby biases diodes 101 and 103 to a conducting condition which allows a pulse from source 109 to reach pulsing circuit 75 and thereby apply printing voltage to electrode 55–1.

Due to the synchronization of the run-down period with the rotation of the recording electrode the position laterally of sheet 25 in which a dot is printed is, in this manner, made proportional to an instantaneous value of the signal voltage.

The above described cycle of operations is repeated as electrodes 55–2 and 55–3 scan the recording medium. Permanent magnets 81–2 and 81–3 are angularly positioned about the periphery of disc 11 for cooperation with magnet coils 83, 85, to time the events in which these last named electrodes respectively take part. The medium is thus repeatedly scanned in rapid sequence at closely spaced positions in the direction of paper travel and a point plotted during each scan, to reproduce the wave of signal voltage as a latent electrostatic image on the surface of sheet 25 which can be rendered permanently visible by means earlier described herein.

In the second operating cycle of generator 71 shown in Fig. 9 a shorter run-down from origin C to a point H having a higher voltage value, H'H, than point $G_1$, is illustrated. The signal voltage corresponding thereto, also designated H'H, is shown in Fig. 10. The rate of run-down from origin C is high enough so that any change of signal voltage occurring during the run-down period is negligible. Fig. 8, although not showing actual operating relationships, better illustrates this point than does the expanded diagram of Fig. 9. The run-down period of generator 71 therein shown by voltage wave 121 may be of the order of a few microseconds, which allows a signal wave 123 having relatively high frequency components to be recorded.

Fig. 13 shows a modification of the arrangement of Fig. 5 using the cathode ray tube of Fig. 1 as a recording electrode selection means. In this circuit sweep generator 125 is free-running in contrast to triggered generator 71 of Fig. 5. The circuit of generator 125 may, for example, be that of an astable Phantastron, described in the cited reference "Waveforms," page 199 et seq. thereof. In this case, the cyclic operation of generator 125 corresponds for timing purposes to the rotation of disc 51 of Fig. 5 so that a selected point or points in the operating cycle of the generator can be made use of to time the recording process, as described below.

Figure 14:
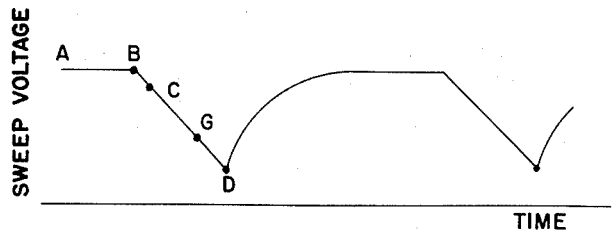
Fig. 14 is another waveform diagram, for purposes of explanation.

Fig. 14 is a simplified waveform diagram of the output voltage of free-running or periodic generator 125. At reference point C on the linear run-down portion of the wave, gate 127 is opened for a suitable period through the sensing of this point by a voltage amplitude selector circuit 129, of known design which may include means controlling the duration and shape of the output pulse supplied thereby, to allow a sample signal voltage from source 33 to be applied to comparator 73, which also receives an input from generator 125. As described in connection with Fig. 9, at some point G of the run-down the sweep voltage becomes equal in magnitude to the signal voltage and an instant later circuit 73 supplies an output to pulse circuit 131, similar to circuit 75, causing circuit 131 to change the potential of control electrode 13 of tube 11 to a value permitting the formation of an electron beam, the beam having previously been suppressed, as by the biasing of electrode 13, by means not shown. The output voltage of generator 125 is also applied to beam deflecting electrodes 15 to result in a variable deflecting voltage which would cause the position of the beam, if formed, to vary along electrodes 17 in correspondence with the run-down of generator 125. Thus, when the beam is actually formed it strikes an electrode 17 corresponding in position to the instantaneous signal voltage sensed by comparator 73. An associated recording electrode 21 is simultaneously energized, as previously described in connection with the arrangement of Fig. 1.

The electron beam of tube 11 preferably is suppressed during the return sweep from D to A (Fig. 14), for example by sweep circuit-controlled cathode-connected blanking circuit 133 which, by control of the electron accelerating voltage prevents beam formation regardless of the potential of control electrode 13. Circuits for modulating or suppressing the electron beam under predetermined conditions, sometimes referred to as "Z axis" modulation, are known in arts employing cathode ray tubes and are not shown in detail herein.

While preferred embodiments of the invention are shown and described herein, these are by way of illustration and not of limitation. The limits of the invention are defined solely in the appended claims.

What is claimed is:

1. In apparatus for making an electrostatic point-by-point record of an electrical waveform the combination of: a source supplying a signal voltage characterized by said waveform; a recording medium adapted to retain an electrostatic charge; means defining a recording station; means for transporting said medium past said station, said station having an axis extending transversely of the displacement of the medium; scannable electrode means at the station operative when suitably energized to produce a discharge at said station at a position along said axis causing the surface of the medium nearest said position to acquire an electrostatic charge over a limited area thereof, scanning means for causing said electrode means to scan along said axis; and means for selectively energizing said electrode means to cause an electrical discharge of the aforesaid character to occur in a position along said axis corresponding to the then existing instantaneous value of the signal voltage, said last means including: means, operable in synchronism with said scanning means, for generating a timing wave having an amplitude including a portion thereof varying substantially linearly with time; means for detecting substantial equality between the instantaneous magnitude of the said timing wave and the magnitude of the signal supplied by said source; means operable in synchronism with said timing wave generating means to connect said source of signal voltage to said detecting means only during said substantially linear portion of said timing wave; and means connected to said detecting means and responsive to the detection of such said substantial equality for energizing said electrode means.

2. In a waveform recording device; connecting means connectible to a source of a physical input representing a waveform; means for moving a record medium along a given path; recording means adapted to scan repeatedly along an axis at right angles to the said path and substantially parallel to the surface of the said record medium and, when stimulated by a control signal, to produce a recorded area on the said medium; sweep generator means operable in synchronism with the scan of the said recording means to produce repetitive time-varying amplitude cycles each characterized by a high degree of identity from one cycle to the next of a restricted portion thereof; pulse shaping means operable in synchronism with the scan of said recording means and thus in synchronism with said sweep generator means to produce a gate opening signal during and only during the time of occurrence of the said restricted portion of each said amplitude cycle; gating means connected to said source connectible means to receive input waveform signal thereof and operable by said gate opening signal to transmit such waveform input only during the existence thereof; comparator means connected to said gating means to receive such transmitted waveform input, and also connected to said sweep generator means to receive the said repetitive time-varying amplitude cycles, and operable to produce a control signal as output when and only when the input waveform to said connecting means transmitted by said gating means equals the instantaneous amplitude of one of said repetitive time-varying cycles, and further connected to said recording means to stimulate said recording means by said control signal to produce a said recorded area on said medium.

3. A waveform recording device according to claim 2, particularly characterized by a cathode-ray tube having target electrodes and a multiplicity of recording electrodes connected to the target electrodes.

4. In apparatus for making an electrostatic record of an electrical waveform, the combination of: a source of a signal characterized by said waveform; means defining a recording station and an axis of recorded amplitudes thereof; a base electrode at said station extending in the direction of said axis; a displaceable member; means for cyclically displacing said member at said station at a uniform rate in the direction of said axis; a pin electrode mounted by said member in closely spaced relation along the path thereof to said base electrode; a recording member capable of retaining an electrostatic charge positioned in the space between said pin and base electrodes; means for transporting said recording member in a direction transverse to said axis; means for generating synchronously with the displacement of said member a timing wave having a non-linear region and a linear region in which the amplitude varies substantially linearly with time; selecting means operable in synchronism with the displacement of said member and thus synchronously with said timing wave to generate a selection signal after the said timing wave has reached the linearly varying region of its output and continuing not longer than the duration of said linearly varying region, the phase or time relationship of the said timing wave and of the said selection signal with respect to the said displacement of said member being such that the initiation of the said selection signal defines a time origin for the displacement of said pin electrode relative to said recording member; gating means connected to said signal source and controllable by the said selection signal and rendered transmissive by the application of said selection signal to transmit the said waveform signal to comparator means; comparator means connected to said gating means and said timing wave generating means and responsive to a predetermined correspondence between the amplitudes of said signal and said timing wave to produce an output; means responsive to said output for causing a silent invisible electrical discharge to occur between said pin and base electrodes resulting in electrostatically charging the recording member over a dot-like area corresponding in form to the form of the pin electrode.

5. The combination defined in claim 4 wherein means for generating electrical signals at predetermined positions of said displaceable member are provided for causing said means for generating a timing wave and said selecting means to operate synchronously with the displacement of the said member.

6. In apparatus for making a point-by-point record of a waveform expresed as an electrical signal whose voltage amplitude is a function of time: means connectible to a source of such said signal; a record medium adapted to store an electrical charge on the surface thereof; means for displacing a point electrode along a linear path across said medium in proximity to the said surface and at a constant rate; means establishing an origin of time for such displacement; comparison voltage means for generating repetitively as a function of time and synchronously with said origin of time a varying comparison voltage whose range includes the values of signal voltage to be measured, the relation between the said comparison voltage and the time being a predetermined function for a part of the range of excursion of said comparison voltage; comparator means for detecting the time of substantial equality between the said comparison voltage and the said signal voltage and generating a control signal responsively thereto; means operable in synchronism with said comparison voltage means for disconnecting the said signal voltage from the said comparator means during the portion of the cycle of said comparison voltage means when the relation between the said comparison voltage and time is not the said predetermined function; and means for producing responsively to said control signal generated by said comparator means a discharge from said electrode to charge a limited area of the surface of the said medium at an instant when the value of the displacement time of said electrode measured from said time origin is in predetermined relationship to the then existing instantaneous value of signal voltage measured as a time interval by said comparison voltage and comparator means.

References Cited in the file of this patent

UNITED STATES PATENTS

| | | |
|---|---|---|
| 1,116,949 | Stille | Nov. 10, 1914 |
| 2,143,214 | Selenyi | Jan. 10, 1939 |
| 2,501,791 | Silverman | Mar. 28, 1950 |
| 2,513,947 | Levy | July 4, 1950 |
| 2,565,486 | Feinstein et al. | Aug. 28, 1951 |
| 2,591,138 | Cooley | Apr. 1, 1952 |
| 2,599,949 | Skellett | June 10, 1952 |
| 2,635,032 | Shea | Apr. 14, 1953 |
| 2,639,965 | Holcomb | May 26, 1953 |
| 2,648,589 | Hickman | Aug. 11, 1953 |
| 2,712,128 | Woodruff | June 28, 1955 |
| 2,716,826 | Huebner | Sept. 6, 1955 |
| 2,733,358 | Carapellotti | Jan. 31, 1956 |
| 2,739,865 | Wiley | Mar. 27, 1956 |
| 2,777,745 | McNaney | Jan. 15, 1957 |

OTHER REFERENCES

Industrial and Engineering Chemistry, vol. 31, #7, July 1939, page 807.

Radio News, December 1945, page 2 (copy found in 317-258).